(12) United States Patent
Gohil et al.

(10) Patent No.: US 10,754,669 B2
(45) Date of Patent: *Aug. 25, 2020

(54) RUNNING AN APPLICATION WITHIN AN APPLICATION EXECUTION ENVIRONMENT AND PREPARATION OF AN APPLICATION FOR THE SAME

(71) Applicant: International Business Machines Corporation, Armonk, NY (US)

(72) Inventors: Pradeep Gohil, Eastleigh (GB); Stephen J. Hobson, Hampton (GB); Anthony P. Papageorgiou, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/256,325

(22) Filed: Jan. 24, 2019

(65) Prior Publication Data
US 2019/0163501 A1    May 30, 2019

Related U.S. Application Data

(63) Continuation of application No. 15/279,788, filed on Sep. 29, 2016, now Pat. No. 10,228,955.

(51) Int. Cl.
*G06F 9/448* (2018.01)
*G06F 9/445* (2018.01)
*G06F 16/24* (2019.01)

(52) U.S. Cl.
CPC ............ *G06F 9/4494* (2018.02); *G06F 9/445* (2013.01); *G06F 16/24* (2019.01)

(58) Field of Classification Search
None
See application file for complete search history.

(56) References Cited

U.S. PATENT DOCUMENTS

| 7,617,174 B2 * | 11/2009 | Chen ................. G06Q 10/0631 706/62 |
| 8,356,026 B2 | 1/2013 | Heimendinger |

(Continued)

FOREIGN PATENT DOCUMENTS

EP    1771023    4/2007

OTHER PUBLICATIONS

Jagannath et al., "Change-Aware Preemption Prioritization", International Symposium on Software Testing and Analysis (ISSTA '11), Toronto, ON Canada, Jul. 17-21, 2011, 11 pages.

(Continued)

*Primary Examiner* — Umut Onat
(74) *Attorney, Agent, or Firm* — Heslin Rothenberg Farley & Mesiti P.C.; William A. Kinnaman, Esq.

(57) ABSTRACT

Computer-implemented methods are provided for preparing an application for execution within an application execution environment and for running an application within an application execution environment. The computer-implemented methods create supplementary information for the application. The supplementary information includes an indication of a service request which is to be performed during execution of the application to obtain information from an application service. The computer-implemented methods retrieve the supplementary information for the application, and execute the application within the application execution environment. The methods perform the service request from the application execution environment independently from the execution of the application based on the supplementary information, and receive a response to the service request from the application service at the application execution environment. The method provides the response from the application execution environment to the application in (Continued)

response to a request from the application to perform the service request.

20 Claims, 6 Drawing Sheets

(56) References Cited

U.S. PATENT DOCUMENTS

| | | | |
|---|---|---|---|
| 9,032,404 | B2 | 5/2015 | Kissell |
| 9,189,355 | B1* | 11/2015 | Moturu ................. G06F 11/301 |
| 9,946,653 | B2* | 4/2018 | Yamamoto .......... G06F 12/0862 |
| 10,228,955 | B2* | 3/2019 | Gohil ...................... G06F 9/445 |
| 2003/0028579 | A1 | 2/2003 | Kulkarni et al. |
| 2008/0134220 | A1* | 6/2008 | Weiss ...................... G06F 9/445 |
| | | | 719/329 |
| 2009/0182728 | A1* | 7/2009 | Anderson ............. G06F 16/113 |
| 2011/0093790 | A1 | 4/2011 | Maczuba |
| 2014/0365626 | A1 | 12/2014 | Radhakrishnan et al. |
| 2015/0381744 | A1* | 12/2015 | Na ........................ G06F 9/5072 |
| | | | 709/203 |

OTHER PUBLICATIONS

Intel Corporation, "Optiizing Without Breaking a Sweat", https://softwareintel.com/en-us/articles/optimizing-without-breaking-a-sweat, published Mar. 13, 2012, 19 pages.

List of IBM Patents or Patent Applications Treated as Related, Jan. 30, 2019, 2 pages.

* cited by examiner

RUNNING AN APPLICATION WITHIN AN APPLICATION EXECUTION ENVIRONMENT AND PREPARATION OF AN APPLICATION FOR THE SAME

BACKGROUND

The present invention relates to application execution environments. In particular, it relates to running applications within application execution environments and to the preparation of applications for execution within such application execution environments.

Application execution environments provide an environment in which applications may be executed. They typically provide a number of functions which support the execution of applications within the environment. Such functions include, for example, functions which allow control over the applications running in the environment, provide access to storage, facilitate inter-application communications within the environment or allow communications with external services outside of the environment. However, there are many other functions which may be provided by an application execution environment in order to support the execution of applications. Applications running within an application execution environment may make use of these functions provided by the application execution environment in order to carry out their tasks. At a general level, any operating system may be considered as providing an application execution environment. However, more specialized application execution environments exist which are designed to support rapid high-volume online transaction processing, such as Customer Information Control System, CICS® (CICS is a trademark of International Business Machines Corporation, registered in many jurisdictions worldwide). CICS® is commonly used within a mainframe computing system environment to manage large-scale computer processing transactions for "enterprise" user organizations such as banks, brokerage firms, insurance companies, large retailers, and so on. More specialized application execution environments, such as CICS®, typically provide functionality which goes beyond (or augments) the functionality provided by an operating system. Such application execution environments may be provided as middleware running on top of an operating system.

SUMMARY

According to an aspect of the invention, there is provided a computer-implemented method for running an application within an application execution environment. The method retrieves supplementary information for the application. The supplementary information includes an indication of a service request which is to be performed during execution of the application to obtain information from an application service. The method executes the application within the application execution environment. The method performs the service request from the application execution environment independently from the execution of the application based on the supplementary information. The method receives a response to the service request from the application service at the application execution environment. The method provides the response from the application execution environment to the application in response to a request from the application to perform the service request.

According to another aspect of the invention there is provided a computer program product for running an application within an application execution environment. The computer program product comprises a computer readable storage medium. The computer readable storage medium has program instructions which are executable by a processor stored thereon. The program instructions are executable by a processor to cause the processor to carry out the above-summarized method.

According to another aspect of the invention there is provided a computer-implemented method for preparing an application for execution within an application execution environment. The method creates supplementary information for the application. The supplementary information comprises an indication of a service request which is to be performed during execution of the application to obtain information from an application service.

BRIEF DESCRIPTION OF THE DRAWINGS

Embodiments of the invention are described below, by way of example only, with reference to the accompanying drawings, in which.

DETAILED DESCRIPTION

In the description that follows and in the figures, certain embodiments of the invention are described. However, it will be appreciated that the invention is not limited to only the embodiments that are described and that some embodiments may not include all the features that are described below. It will be evident, however, that various modifications and changes may be made herein without departing from the broader spirit and scope of the invention as set forth in the appended claims.

Figure 1:
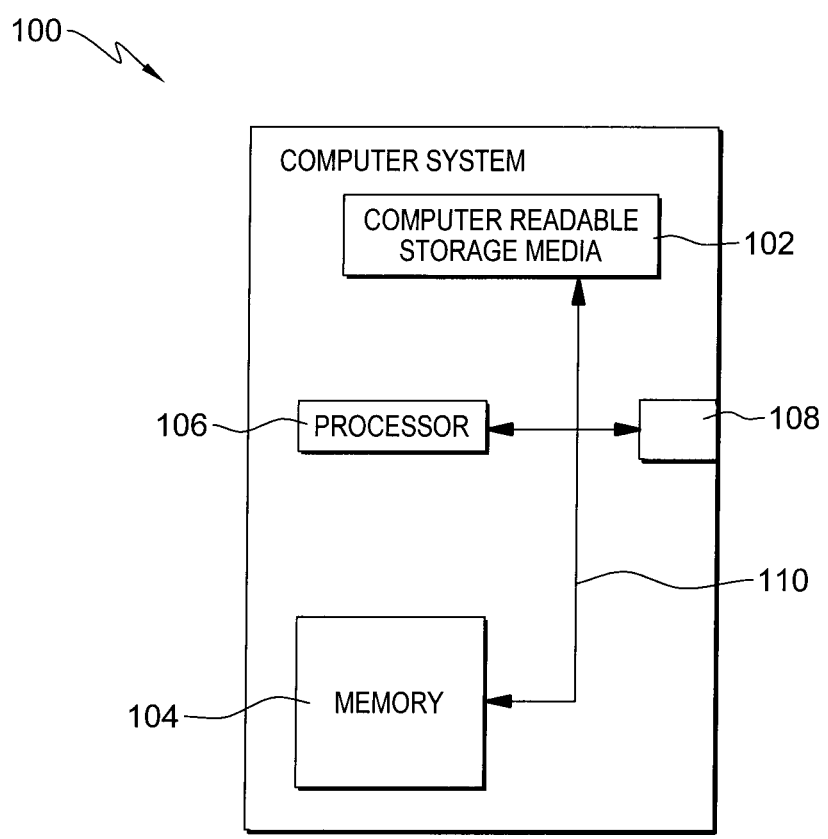
FIG. 1 schematically illustrates an exemplary computer system to implement processing, in accordance with one or more aspects of the present invention.

FIG. 1 of the accompanying drawings schematically illustrates an exemplary computer system 100 upon which embodiments of the present invention may run. The exemplary computer system 100 comprises a computer readable storage medium 102, a memory 104, a processor 106 and one or more interfaces 108, which are all linked together over one or more communication busses 110. The exemplary computer system 100 may take the form of a conventional computer system, such as, for example, a desktop computer, a personal computer, a laptop, a tablet, a smart phone, a smart watch, a virtual reality headset, a server, a mainframe computer, and so on.

The computer readable storage medium 102 and/or the memory 104 may store one or more computer programs (or software or code) and/or data. The computer programs stored in the computer readable storage medium 102 may include an operating system for the processor 106 to execute in order for the computer system 100 to function. The computer programs stored in the computer readable storage medium 102 and/or the memory 104 may include computer programs according to embodiments of the invention or computer programs that, when executed by the processor 106, cause the processor 106 to carry out a method according to an embodiment of the invention The processor 106 may be any data processing unit suitable for executing one or more computer readable program instructions, such as those belonging to computer programs stored in the computer readable storage medium 102 and/or the memory 104. As part of the execution of one or more computer readable program instructions, the processor 106 may store data to and/or read data from the computer readable storage medium 102 and/or the memory 104. The processor 106 may comprise a single data processing unit or multiple data processing units operating in parallel or in cooperation with each other. The processor 106 may, as part of the execution of one or more computer readable program instructions, store data to and/or read data from the computer readable storage medium 102 and/or the memory 104.

The one or more interfaces 108 may include a network interface enabling the computer system 100 to communicate with other computer systems across a network. The network may be any kind of network suitable for transmitting or communicating data from one computer system to another. For example, the network could include one or more of a local area network, a wide area network, a metropolitan area network, the internet, a wireless communications network, and so on. The computer system 100 may communicate with other computer systems over the network via any suitable communication mechanism/protocol. The processor 106 may communicate with the network interface via the one or more communication busses 110 to cause the network interface to send data and/or commands to another computer system over the network. Similarly, the one or more communication busses 110 enable the processor 106 to operate on data and/or commands received by the computer system 100 via the network interface from other computer systems over the network.

The interface 108 may alternatively or additionally include a user input interface and/or a user output interface. The user input interface may be arranged to receive input from a user, or operator, of the system 100. The user may provide this input via one or more user input devices (not shown), such as a mouse (or other pointing device, track-ball or keyboard). The user output interface may be arranged to provide a graphical/visual output to a user or operator of the system 100 on a display (or monitor or screen) (not shown). The processor 106 may instruct the user output interface to form an image/video signal which causes the display to show a desired graphical output. The display may be touch-sensitive enabling the user to provide an input by touching or pressing the display.

It will be appreciated that the architecture of the computer system 100 illustrated in FIG. 1 and described above is merely exemplary and that systems having different architectures using alternative components or using more components (or fewer) may be used instead.

With the advent of internet/web-based transaction processing, more enterprise users are moving towards implementation of a "service-oriented architecture" (SOA). Within a service-oriented architecture, applications provide services to other applications. That is to say, an application, typically referred to as a service consumer, may issue a service request (or query) to be processed by another application, typically referred to as an application service (or service provider). The application service may provide a response back to the application. The communications between applications and application services may take place over a network, such as the Internet. An application in a service-oriented architecture may make many requests during the course of its execution in order to obtain information from different application services. With each request for information to a service, the application must typically wait for a response from that service before it can continue. This can adversely affect the response time (or speed) with which an application is able to execute, which is often considered to be a key issue in application development.

It is common for applications within an SOA to rely on many different services offered by various service providers, including those that are both local to, or remote from, the location where the application is running. As an example, an application which results in a user being provided with a line of credit may make use of an external application service provided by a credit reference agency to carry out a credit check. The application may therefore issue a service request to the credit checking service containing necessary information (such as name, address, date of birth and so on for an individual) and will then wait to receive a response from the credit checking service indicating the credit-worthiness of the individual. Once the response has been received, the application may decide whether or not to proceed with allowing the line of credit to be provided based on the response provided by the credit checking service. As another example, an application may, at some point during its processing, issue a request to an address application service in order to obtain a customer's address from a supplied house number and a postcode. In this example, the application may issue a request containing the necessary information (e.g. house number and postcode) and would receive a response back from the address application service with the full address details. In a typical application, some processing would be performed before the service request is issued (e.g. to obtain the house number and postcode or name, address and date of birth).

Figure 2:
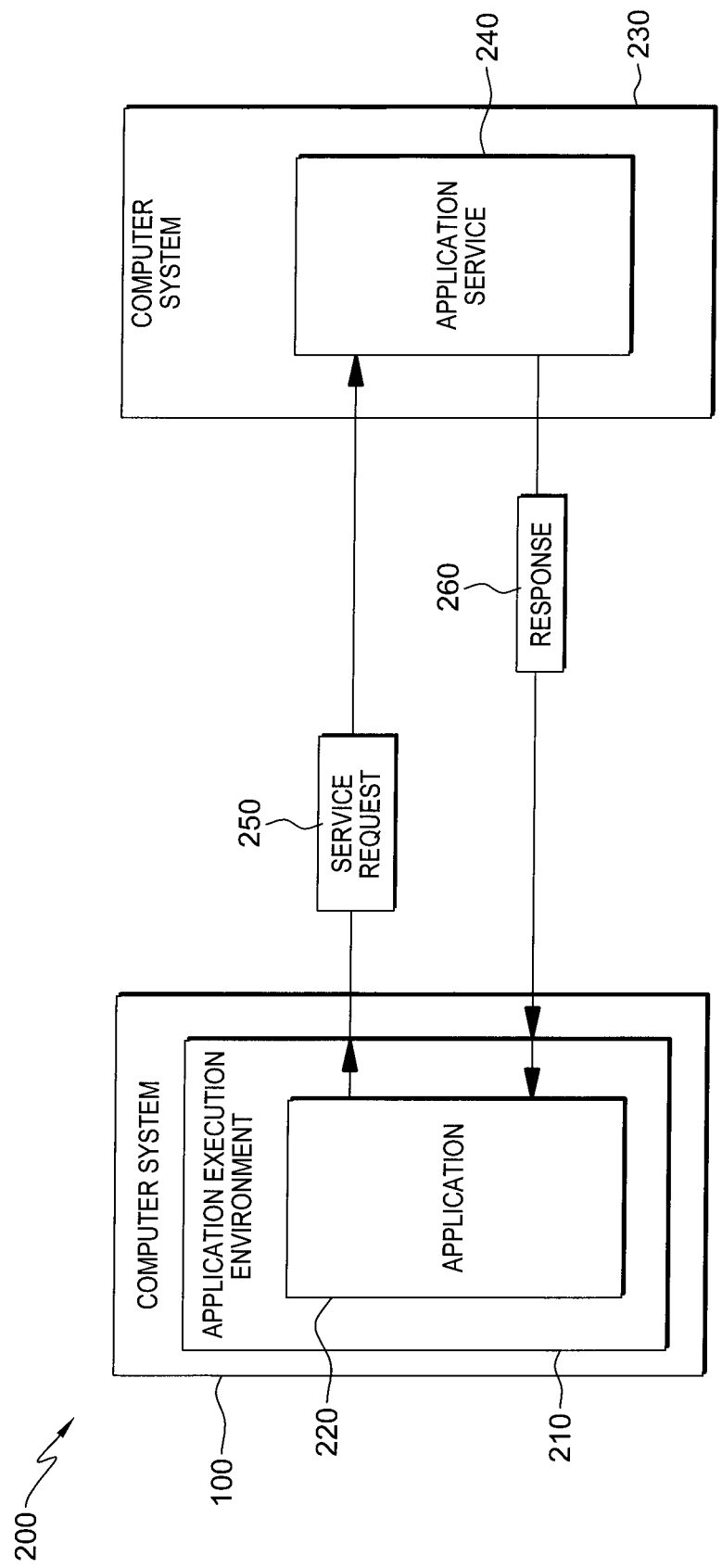
FIG. 2 schematically illustrates an exemplary system arrangement within which processing may be implemented, in accordance with one or more aspects of the present invention.

FIG. 2 of the accompanying drawings schematically illustrates an exemplary system arrangement 200 within which embodiments of the invention may run. The system 200 includes exemplary computer system 100. In the exemplary system 200, the exemplary computer system 100 provides an application execution environment 210 within which an application 220 may be run. The system 200 also includes a second computer system 230 upon which an application service 240 may be run. The exemplary computer system 100 and the second computer system 230 can communicate via a network, such as the internet.

The application 220 is enabled to send a service request (or query) 250 to the application service 240 over the network by the application execution environment 210. That is to say, the application 220 may issue the request 250 to the application execution environment 220 (or, alternatively, the application execution environment 210 may intercept the request 250 from the application 220) and the application execution environment 220 may then pass the request 250 on to the application service 240. The application service 240 may then process the request 250 and generate an appropriate response 260 which is transmitted back to the application 220 over the network via the application execution environment 210.

Figure 3:
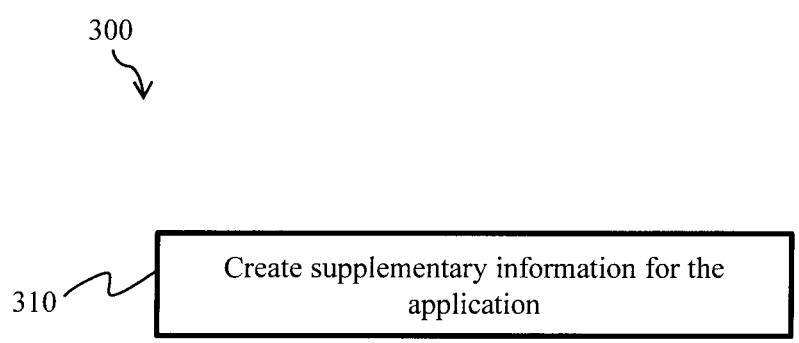
FIG. 3 is a diagram that schematically illustrates a computer-implemented method for preparing an application for execution within an application execution environment, in accordance with one or more aspects of the present invention.

FIG. 3 of the accompanying drawings is a diagram that schematically illustrates a computer-implemented method 300 for preparing an application 220 for execution within an application execution environment 210 according to embodiments of the invention.

At a step 310, the method 300 creates supplementary information for the application 220. The supplementary information includes information which indicates a service request 250 which is performed by the application 220 when it is run (or executed) within the application execution environment 210 in order to obtain information from an application service that is required (or at least desired) for the operation of the application. The supplementary information may indicate all of the service requests that are to be made by the application 220 during its execution or alternatively may only indicate a subset thereof (such as, for example, a single service request 250).

The supplementary information includes all the information that is necessary for the application execution environment 210 to perform the service request 250. For example, the supplementary information includes an indication of the application service 240 to which the service request 250 is to be sent. Where the service request 250 has parameters which may be required, the supplementary information may also include information indicating such parameters. The supplementary information may indicate static values which are to be provided as arguments for such parameters, particularly where the argument for a particular parameter does not change. Alternatively, or additionally (i.e. in combination with the indication of static values for some of the arguments), the supplementary information may include information about a location from which the data which is to be provided as arguments for one or more of the parameters may be retrieved. This location might be, for example, a memory offset location specified relative to the program's memory space. Alternatively, or additionally, in the case of CICS, for example, the location could be an indication of a named container on a channel from which the data can be retrieved. The location might also be an identification of a particular environment variable that is set (or provided) when the application execution environment is instructed to execute the application.

The supplementary information may be provided as a properties file which is collocated with the application. That is to say, a file may be created with a particular predetermined name and/or extension, such as "application.properties", and placed in the same directory as the application. However, it will be appreciated that this is but one way in which the supplementary information may be provided and other ways of providing the supplementary information may be used instead. For example, the file could be located in a common directory within the application execution environment 210 together with the properties files for other applications which are to be run by the application execution environment 210. Alternatively, the supplementary information may be provided by a database or web service from which the application execution environment 210 may remotely retrieve the supplementary information for a particular application prior to running it. Similarly, multiple sources of supplementary information may be provided for a given application 220, including, for example, having a separate file for each request made by the application, or retrieving some of the supplementary information from a properties file and the rest of the supplementary information from a database or web server. The supplementary information may be manually generated.

Figure 4:
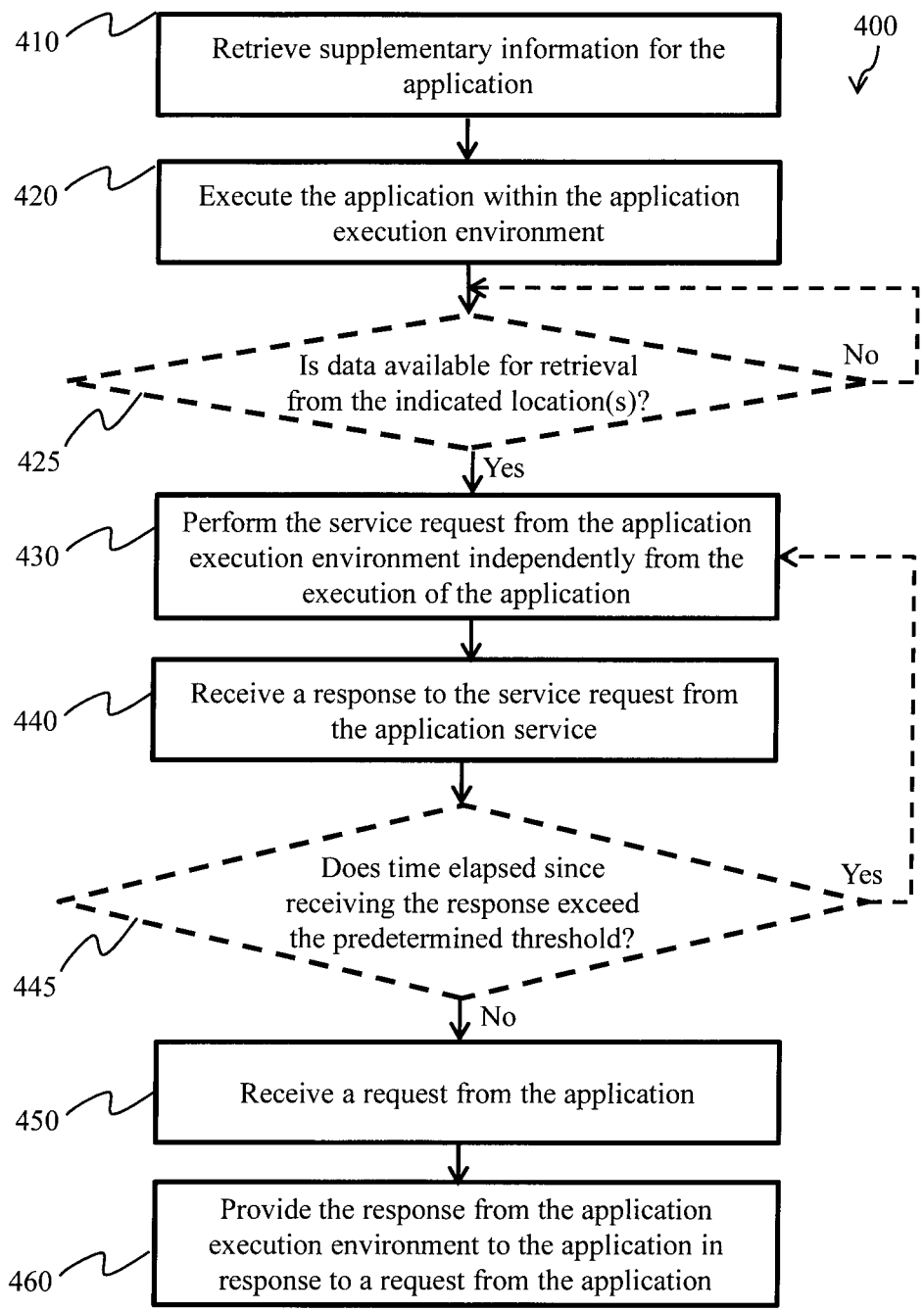
FIG. 4 is a diagram that schematically illustrates a computer-implemented method for running an application within an application execution environment, in accordance with one or more aspects of the present invention.

FIG. 4 of the accompanying drawings is a diagram that schematically illustrates a computer-implemented method 400 for running an application 220 (FIG. 2) within an application execution environment 210 (FIG. 2) according to embodiments of the invention.

Referring collectively to FIGS. 2 & 4, at a step 410, the method 400, as performed by the application execution environment 210, retrieves supplementary information for the application 220. As mentioned above, the supplementary information may be retrieved by identifying a file having a predetermined name in the same directory from which the application is loaded. For example, retrieving the supplementary information may involve finding the file "application.properties" in the application's directory. However, any other suitable method for retrieving the supplementary information (such as issuing a service request or database lookup) may be used instead.

At a step 420, the method 400 executes (or runs) the application within the application execution environment 210.

At a step 430, the method 400 performs the service request from the application execution environment 210. This service request 250 is performed independently from the execution of the application 220 and is based on the supplementary information that was retrieved at step 410. That is to say, the service request 250 may be performed by the application execution environment 210 while the application 220 carries on with its own processing. Also, because the supplementary information identifies the requests that are going to be performed by the application 220 and provides the information necessary for the requests to be performed, the application execution environment 210 can proceed to independently make the necessary service requests 250 without receiving any instructions from the application 220. Where the supplementary information indicates data which is to be provided as an argument for one or more parameters of the service request 250, the method 400 retrieves the data from the location indicated by the supplementary information and includes the data in the service request 250 as the argument for that parameter. In some embodiments, the application execution environment 210 may proceed to make the service request 250 straight away at the same time as it starts the application 220. In other embodiments, however, the supplementary information may indicate that a particular parameter is required to be set in the service request 250. While the supplementary information may indicate the location from which the data which is to be used as the argument for such a parameter may be retrieved, this data may not be immediately available from the outset of the application's execution. For example, the data which is to be used as the argument might only be set later on in the application's execution in response to a user input or as a result of the response from another service request. In such cases, the method 400 may perform the optional additional step 425 of monitoring the locations which are identified by the supplementary information as being locations from which the data which is to be used as arguments for at least some of the request's parameters to determine whether the data is available for retrieval from those locations (i.e. once the data has been set by the application 220). Once it has been determined that the data is available for retrieval from the location(s), the service request 250 may then be performed. As an example, where the data to be provided as the argument for a parameter of the request is indicated as being available as a particular named container on a channel in a CICS, the method 400 may monitor the channel to determine when the named container is available on the channel and, once the named container is set on the channel, may then proceed to retrieve the data from the named container and issue the service request 250 including that data as an argument for the indicated parameter. It should be noted that even though it may be necessary for the application execution environment 210 to wait for data which is to be used as parameter arguments to become available before the request 250 is sent, the request 250 can still sent by the application execution environment 210 independently from the execution of the application 220 itself and before the application 220 requests it.

At a step 440, the method 400 receives a response 260 to the service request 250 from the application service 240 at the application execution environment 210. The response 260 is stored by the application execution environment 210 so that it may be retrieved later on when required by the application 220.

Optionally, the method 400 may determine, at a step 445, whether a time that has elapsed since receiving the response 260 to the service request 250 from the application service 240 exceeds a predetermined threshold. In other words, a validity window may be defined for the response 260 to any particular service request 250. If the elapsed time does exceed the predetermined threshold, the application execution environment 210 may repeat the service request 250. This ensures that the response 260 that is stored and passed to the application 220 does not contain information that is too stale to be relied upon by the application 220. As an example, the application execution environment 210 may record a time at which the service response 260 was received and may compare this to the current time in order to determine an elapsed time.

Alternatively, the application execution environment 210 may compare a timestamp that is contained within the response 260 itself with the current time in order to determine an elapsed time. It will be appreciated that other ways of determining an elapsed time may be used instead, such as, for example, triggering a timer (which may count down or up from/to the threshold) when the response 260 is received. The validity window or predetermined threshold that is to be used for the response 260 to a particular service request 250 may be indicated by the supplementary information and may be different for each service request that is indicated by the supplementary information.

At a step 450, the method 400 receives a request from the application 220 to perform the service request 250. Upon receiving the request from the application 220, the method 400 may check that the request 250 that is received from the application 220 corresponds to (or matches) the request that was pre-emptively sent to the application service 240 at step 430. If the request 250 that was sent at step 430 does not match the request which is received from the application 220 (for example, if the arguments provided as the parameters on the pre-emptively sent request are different from those for the request provided by the application 220 at step 430), the method 400 may issue a new service request 250 to the application service 240 based on the request that was received from the application 220 at step 450. The optional step 445 of determining (or checking) whether the time that has elapsed since receiving the response 260 to the service request 250 exceeds a predetermined threshold may be performed in response to receiving the service request from the application 220 (not shown). However, it will be appreciated that where the optional step 445 is included in the method 400, the determination need not be performed in response to the receipt of the request from the application 220 and may instead (or additionally) be performed prior to the request being received such as, for example, being performed on a periodic basis in order to ensure that the stored response remains current.

At a step 460, the method 400 provides the response 260 from the application execution environment 210 to the application 220 in response to the request from the application 220 to perform the service request 250. In other words, the application execution environment 210 retrieves the response 260 that was received and stored at step 440 and passes it to the application 220. It will be appreciated that in some situations, the response 260 may not have been received at the point in time that application 220 makes the request. For example, this could be because the response time from the application service 240 is sufficiently slow that the application 220 reaches the point in its execution where it makes the request before the response 260 is received. In these situations, the execution of the application 220 may have to wait for the response 260 to be received before the execution of the application 220 can continue. Similarly, the execution of the application 220 may also have to wait for a response 260 to be received in situations where the method 400 issues a new service request (i.e. a re-sent service request) at a later point in time than the original service request, such as when it is determined that the validity window of the original response has expired at step 445 or when it is determined that the original service request does not correspond to the actual request made by the application at step 450.

Figure 5A:
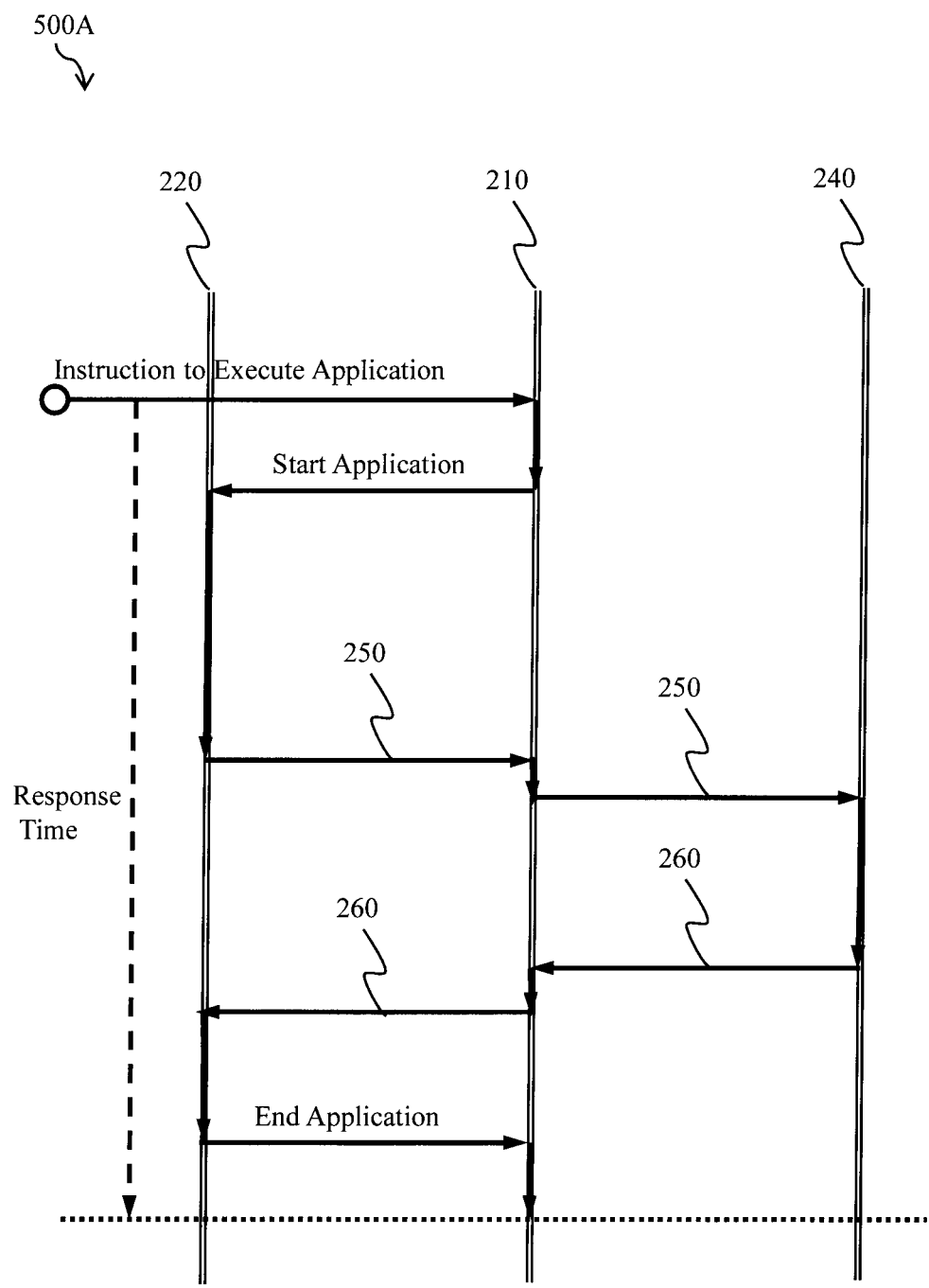
FIG. 5A schematically illustrates a sequence of interactions between an application, an application execution environment, and an application service in a system which does not make use of embodiments of the present invention.
Figure 5B:
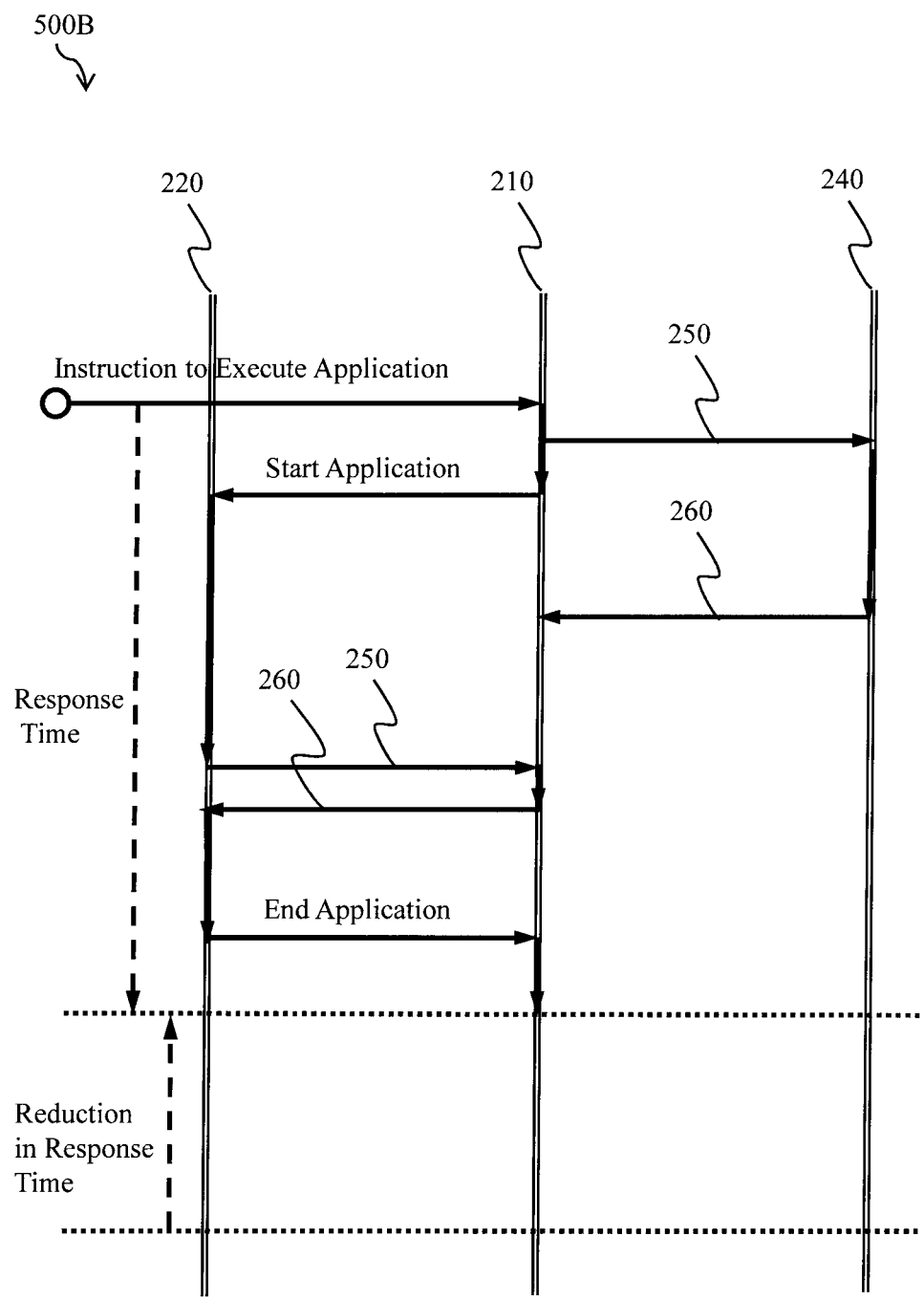
FIG. 5B schematically illustrates a sequence of interactions between an application, an application execution environment, and an application service, in accordance with one or more aspects of the present invention.

FIG. 5A of the accompanying drawings schematically illustrates a typical sequence of interactions 500A between the application 220 (FIG. 2), the application execution environment 210 and the application service 240 in a system which does not make use of embodiments of the invention. Meanwhile, FIG. 5B of the accompanying drawings schematically illustrates a sequence of interactions 500B between the application 220 (FIG. 2), the application execution environment 210 and the application service 240 in a system according to embodiments of the invention which utilize the above-described method 400 (FIG. 4). Referring collectively to FIGS. 2, 5A & 5B, in both sequences of interactions 500A and 500B, the sequence is initiated by the receipt of an instruction to execute the application 220 within the application execution environment 210. Similarly, both sequences of interactions 500A and 500B finish after the application 220 ends and returns to the application execution environment 210 once the application execution environment 210 finishes handling the termination of the application 220. The start of both sequences of interactions 500A and 500B is indicated in the figures by a hollow circle, while the end of both sequences of interactions 500A and 500B is indicated by a dotted line. The response time of the application in both sequences of interactions 500A and 500B is the time between the start and finish of the sequences of interactions as shown by the dashed arrow running down the left hand side of FIGS. 5A and 5B.

In the sequence of interactions 500A illustrated in FIG. 5A, following receipt of the instruction to execute the application by the application execution environment 210, the application execution environment 210 takes some time to initialize the environment before starting the application 220. This may include for example, retrieving the application 220 that is to be run, allocating memory for the application to use and the initialization of any other functionality provided by the application execution environment 210. At some point in the application's execution, the application 220 makes a service request 250 which is passed to the application execution environment 210. For most applications, there will be various processing operations that occur before the service request 250 is made. Following the issue of the service request 250 by the application 220, the application execution environment 210 then forwards the service request 250 to the application service 240. Forwarding the request 250 may involve communicating with another computer system 230 upon which the application service 240 is running, such as the Internet. However, in other embodiments, the application service 240 may be running on the same computer system 100 as the application execution environment 210. There may be a small delay in the forwarding of the service request 250 by the application execution environment 210 as the application execution environment 210 carries out any processing necessary to complete the request 250 such as, for example, forming the request packet itself and looking up the address of the required application service 240. Upon receipt of the service request 250 from the application execution environment 210, the application service 240 carries out any necessary processing to formulate the response, such as, for example, conducting a database query and/or additional service requests of yet other services and, after completing such processing the application service 240 returns a response 260 to the application execution environment 210. Other reasons for delay between the transmission of the request 250 and receipt of the response 260 at the application execution environment includes issues such as network latency and congestion, or queueing of the request by the application service 240 or by any intermediate systems or applications (not shown). Following receipt of the response 260 by the application execution environment 210, the application execution environment 210 provides the response to back to the application 220. There may be a small delay between the response 260 being received by the application execution environment 210 and the response 260 being provided back to the application 220. This is because the application execution environment 210 may carry out processing on the response 260 before providing it to the application 220, such as, for example, translating the format of the response 260 into a form used by the application 220. Having received the response 260, the application 220 can then carry on with its processing.

In the sequence of interactions 500B illustrated in FIG. 5B, following receipt of the instruction to execute the application 220 by the application execution environment 210, the application execution environment 210 takes some time to initialize the environment before starting the application as discussed above in relation to the sequence of interactions 500A illustrated in FIG. 5A. However, in this sequence of interactions, the initialization includes the retrieval of supplementary information for the application 220. As a result of retrieving the supplementary information, the application execution environment has knowledge of at least some, if not all, of the service requests that will be made by the application 220. In some embodiments, where all the information, including any data to be used as arguments for any parameters of the request 250, is available from the supplementary information, the application execution environment 210 may therefore issue the service request 250 during this initialization period before the application 220 has even started. However, this need not be the case and the application execution environment 210 may issue the service request 250 at any other point after the application has been started, but before the request 250 is made by the application 220 to the application execution environment 210. In particular, when the supplementary information indicates data which is to be used as an argument for a parameter of the request 250, the application execution environment 210 may need to wait until the data has been set by the application (such as by setting a named parameter on a channel in the CICS® environment). In such embodiments, the application execution environment 210 may proceed to issue the service request 250 as soon as such data is available, before the request 250 is made by the application 220. Because the request 250 is made independently of the application 220 by the application execution environment 210, the application 220 can be started and begin its processing without needing to wait for a response 260 from the application service 240. Therefore, at the same time as the application 220 is carrying out a first portion of processing prior to the point at which it makes the service request 250, the application service 240 can also be carrying out its respective processing and the response 260 will be provided asynchronously from the execution of the application 220. When the response 260 is received by the application execution environment 210, the application execution environment 210 stores it ready for the point in time at which the application 220 requests it. Before storing the response 260, the application execution environment 210 may carry out any processing on the response 260 that would need to be carried out before the response 260 is provided to the application 220, such as, for example, translating the format of the response 260 into a form used by the application 220. Since the response 260 may be received before it is requested by the application 220, the processing that is performed on the response 260 by the application execution environment 210 can also be performed independently from the execution of the application 220. When the application 220 makes the service request 250, the application execution environment 210 retrieves the stored response 260 and provides it to the application 220. The response 250 may therefore be provided very quickly following the request 250 from the application 220. In any case, since the request 250 may be sent to the application service 240 much earlier due to the use of the supplementary information by the application execution environment 210 to pre-emptively perform the request 250, the response 260 will be available to the application 220 much earlier than if the application execution environment 210 has to wait for the application 220 to make the request 250 before sending the request 250 to the application service 240. Therefore, the response time of the application 220 may be reduced.

It is often considered to be undesirable to make any modifications to an application after it has been developed and deployed into a production environment, unless it is an emergency scenario. This is because it is generally considered that there is a high risk that unintended behaviour may be introduced by modifying the application leading to unexpected consequences within the production environment. This is particularly true of older legacy applications. Some applications may not be modified because the source code for the application is not available, such as when the application is provided by a third-party vendor or even where the source code has simply been lost, meaning that it is not possible to modify and re-compile the application. As discussed above, by providing the application execution environment 210 with the supplementary information, the environment 210 is enabled to pre-emptively send a service request to an application service 240 and thereby reduce the response time for running an application 220 within the application execution environment 210. This is achieved without needing to modify the application 220 itself. Instead, supplementary information for the application 220 detailing at least some of the service requests 250 that the application 220 makes is provided to the application execution environment 210 which uses it to pre-emptively make those service requests 250 for the application 220. Therefore, because it is not necessary to modify the application 220 itself, embodiments of the invention may be used to improve the performance of applications which cannot be modified, such as older legacy programs which would be considered too risky to modify or applications for which the source code is not available.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
executing an application within an application execution environment, comprising:
initiating execution of the application within the application execution environment;
based on the initiating, retrieving supplementary information for the application, the supplementary information comprising an indication of a service request which is to be performed during execution of the application to obtain information from an application service;
performing the service request from the application execution environment independently from and in parallel to the execution of the application, based on the supplementary information; and
receiving a response to the service request from the application service at the application execution environment.

2. The computer-implemented method of claim 1, further comprising:
providing the response from the application execution environment to the application in response to a request from the application to perform the service request.

3. The computer-implemented method according to claim 2, further comprising:
determining whether a time that has elapsed since receiving the response to the service request from the application service exceeds a predetermined threshold and, if so, performing the service request from the application execution environment again.

4. The computer-implemented method according to claim 3, wherein the determination of whether the time that has elapsed since receiving the response to the service request from the application service exceeds the predetermined threshold is performed in response to receiving the request from the application to perform the service request.

5. The computer-implemented method according to claim 1, wherein the supplementary information further comprises an indication of one or more parameters which are to be provided as part of the service request, the supplementary information further indicating, for each of the one or more parameters, a respective location from which data that is to be provided as the argument for that parameter can be retrieved, wherein, performing the service request comprises retrieving the data that is to be provided as the argument for each parameter from the respective location for that parameter and including the data in the service request.

6. The computer-implemented method according to claim 5, further comprising monitoring the respective location for each of one or more of the parameters to determine when the data is available for retrieval from that location, wherein the service request is performed in response to the determination that the data for the one or more of the parameters is available for retrieval.

7. The computer-implemented method according to claim 6, wherein the indication of the respective location comprises an indication of a named container from which the data can be retrieved.

8. The computer-implemented method according to claim 5, wherein the supplementary information is retrieved from a properties file which is collocated with the application.

9. The computer-implemented method of claim 1, wherein retrieving supplementary information for the application is based on the initiating execution of the application.

10. A computer program product comprising:
a computer readable storage medium readable by a processor and storing instructions for execution by the processor for performing a method comprising:
executing an application within an application execution environment, comprising:
initiating execution of the application within the application execution environment;
based on the initiating, retrieving supplementary information for the application, the supplementary information comprising an indication of a service request which is to be performed during execution of the application to obtain information from an application service;
performing the service request from the application execution environment independently from and in parallel to the execution of the application, based on the supplementary information; and
receiving a response to the service request from the application service at the application execution environment.

11. The computer program product of claim 10, the method further comprising:
providing the response from the application execution environment to the application in response to a request from the application to perform the service request.

12. The computer program product according to claim 11, the method further comprising:
determining whether a time that has elapsed since receiving the response to the service request from the application service exceeds a predetermined threshold and, if so, performing the service request again.

13. The computer program product according to claim 12, wherein the determining whether the time has elapsed is responsive to receiving the request from the application to perform the service request.

14. The computer program product according to claim 10, wherein the supplementary information further comprises an indication of one or more parameters which are to be provided as part of the service request, the supplementary information further indicating, for each of the one or more parameters, a respective location from which data that is to be provided as the argument for that parameter can be retrieved, wherein, performing the service request comprises retrieving the data that is to be provided as the argument for each parameter from the respective location for that parameter and including the data in the service request.

15. The computer program product according to claim 14, the method further comprising:
monitoring the respective location for each of one or more of the parameters to determine when the data is available for retrieval from that location, in response to the determination that the data for the one or more of the parameters is available for retrieval.

16. The computer program product according to claim 15, wherein the indication of the respective location comprises an indication of a named container from which the data can be retrieved.

17. The computer program product according to claim 14, wherein the supplementary information is retrieved from a properties file which is collocated with the application.

18. The computer program product according to claim 10, wherein retrieving supplementary information for the application is based on the initiating execution of the application.

19. A computer-implemented method comprising:
- creating supplementary information for the application, the supplementary information comprising an indication of a service request which is to be performed during execution of the application to obtain information from an application service; and
- executing the application within the application execution environment, comprising:
  - initiating execution of the application within the application execution environment;
  - based on the initiating, retrieving the supplementary information for the application;
  - performing the service request from the application execution environment independently from and in parallel to the execution of the application, based on the supplementary information; and
  - receiving a response to the service request from the application service at the application execution environment.

20. The computer-implemented method of claim 19, further comprising:
- providing the response from the application execution environment to the application in response to a request from the application to perform the service request.

* * * * *